US012607373B2

(12) United States Patent
Seo et al.

(10) Patent No.: US 12,607,373 B2
(45) Date of Patent: Apr. 21, 2026

(54) HUMIDIFICATION MODULE AND ELECTRONIC APPARATUS INCLUDING SAME

(71) Applicant: Samsung Electronics Co., Ltd., Suwon-si (KR)

(72) Inventors: Youngchang Seo, Suwon-si (KR); Hyejin Lim, Suwon-si (KR); Jongchan Kwon, Suwon-si (KR); Youngmok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 551 days.

(21) Appl. No.: 18/301,593

(22) Filed: Apr. 17, 2023

(65) Prior Publication Data

US 2023/0266022 A1 Aug. 24, 2023

Related U.S. Application Data

(63) Continuation of application No. PCT/KR2023/002309, filed on Feb. 17, 2023.

(30) Foreign Application Priority Data

Feb. 18, 2022 (KR) ........................ 10-2022-0021299

(51) Int. Cl.
*F24F 6/14* (2006.01)
*B05B 5/053* (2006.01)
(Continued)

(52) U.S. Cl.
CPC ................ *F24F 6/14* (2013.01); *B05B 5/053* (2013.01); *F24F 11/0008* (2013.01); *F24F 11/63* (2018.01)

(58) Field of Classification Search
CPC ... B05B 5/053; F24F 6/14; F24F 11/63; F24F 11/0008
(Continued)

(56) References Cited

U.S. PATENT DOCUMENTS 7,160,362 B2 1/2007 Terada et al.
7,279,322 B2 10/2007 Pui et al.
(Continued)

FOREIGN PATENT DOCUMENTS

CN 105371411 A 3/2016
JP 4196007 B2 12/2008
(Continued)

OTHER PUBLICATIONS

International Search Report and Written Opinion dated May 30, 2023, issued in International Application No. PCT/KR2023/002309.
(Continued)

*Primary Examiner* — Charles S Bushey
(74) *Attorney, Agent, or Firm* — Jefferson IP Law, LLP

(57) ABSTRACT

A humidification module and an electronic apparatus including the same are provided. The humidification module includes a supply part supplying water, a droplet generation part generating droplets by using the water supplied through the supply part, and a blowing part discharging the generated droplets to the outside, the droplet generation part includes a nozzle part including a plurality of nozzles spraying the water supplied through the supply part, and an electrode part including a substrate on which a plurality of holes corresponding to the plurality of respective nozzles are formed and electrodes arranged around the plurality of holes for supplying a voltage to the plurality of nozzles, and the plurality of respective nozzles are arranged to penetrate the corresponding holes.

16 Claims, 9 Drawing Sheets

(51) Int. Cl.
*F24F 11/00* (2018.01)
*F24F 11/63* (2018.01)

(58) Field of Classification Search
USPC ............................................................ 261/26
See application file for complete search history.

(56) References Cited

U.S. PATENT DOCUMENTS

| | | | |
|---|---|---|---|
| 7,494,532 B2 | 2/2009 | Azukizawa et al. | |
| 9,625,167 B2 | 4/2017 | Choi et al. | |
| 10,047,949 B2 * | 8/2018 | Yu | B05B 5/057 |
| 10,248,086 B2 | 4/2019 | Lee et al. | |
| 2004/0237781 A1 | 12/2004 | Terada et al. | |
| 2011/0042481 A1 | 2/2011 | Kanamori et al. | |
| 2017/0212485 A1 | 7/2017 | Lee et al. | |

FOREIGN PATENT DOCUMENTS

| | | |
|---|---|---|
| JP | 2019-98216 A | 6/2019 |
| JP | 2019-098244 A | 6/2019 |
| JP | 2019-098257 A | 6/2019 |
| JP | 2020-065944 A | 4/2020 |
| KR | 10-0568093 B1 | 4/2006 |
| KR | 10-2017-0088649 A | 8/2017 |
| KR | 10-1822927 B1 | 3/2018 |
| KR | 10-1856649 B1 | 5/2018 |
| KR | 10-2195027 B1 | 12/2020 |
| KR | 10-2284715 B1 | 8/2021 |

OTHER PUBLICATIONS

Seo et al., Leaf Vein-Inspired Electrospraying System by Grafting Origami, Chemistry of Materials, American Chemical Society, 2016.

Marin et al., Surface Tension Effects on Submerged Electrosprays, Conference on Advances in Microfluidics & Nanofluidics, AIP Biomicrofluidics, 2012.

* cited by examiner

HUMIDIFICATION MODULE AND ELECTRONIC APPARATUS INCLUDING SAME

CROSS-REFERENCE TO RELATED APPLICATION(S)

This application is a continuation application, claiming priority under § 365(c), of an international application No. PCT/KR2023/002309, filed on Feb. 17, 2023, which is based on and claims the benefit of a Korean patent application number 10-2022-0021299, filed on Feb. 18, 2022, in the Korean Intellectual Property Office, the disclosure of which is incorporated by reference herein in its entirety.

BACKGROUND OF THE INVENTION

1. Field of the Invention

The disclosure relates to a humidification module and an electronic apparatus including the same. More particularly, the disclosure relates to a humidification module that generates droplets through an electrostatic spray method, and an electronic apparatus including the same.

2. Description of the Prior Art

A conventional humidification apparatus can be implemented as a heating type discharging steam generated by heating water, an ultrasonic type that makes water into fine particles through vibration by using an ultrasonic vibrator and discharges the particles, an evaporative type evaporating water by using a filter, and a combination type wherein a heating type and an ultrasonic type are combined.

Recently, a humidification module by an electrostatic spray method that applies a high electric field to liquid provided through a fine nozzle, and atomizes water by using a surface changing characteristic of water is being provided. In electrostatic spray, various spray characteristics exist by an applied voltage, a flow amount, surface tension of liquid, electrical conductivity, a supplied flow amount, etc., and among them, cone jet mode electrostatic spray that can spray fine droplets stably is utilized the most. In cone jet mode electrostatic spray, through first atomization by a Taylor cone end jet made through an interaction between surface tension of liquid and an external electrical force, and second atomization by a Rayleigh breakup phenomenon, fine droplets of a size that is scores or hundreds of times smaller than the size of a spray nozzle can be generated. As the diameter of the nozzle is reduced more, a starting voltage of electrostatic spray becomes lower, and accordingly, stable electrostatic spray becomes possible. Thus, a micro nozzle having a diameter of scores of micrometers is being used widely in electrostatic spray.

A humidification module by a conventional electrostatic spray method has a structure wherein a nozzle and an electrode plate are arranged to be distanced from each other in a form of facing each other. In this case, the humidification module has a double voltage structure wherein a voltage is applied to water supplied to the humidification module, and at the same time, a voltage is also applied to the electrode plate between the nozzle and the ground plate, and there is a limit that due to the distance between the nozzle and the electrode plate, voltage supply is not smooth.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide a humidification module wherein a nozzle is arranged to penetrate a hole formed on an electrode plate, and a voltage is induced to the nozzle through an electrode arranged around the hole, and water supplied to the nozzle is electrostatically sprayed, and an electronic apparatus including the same.

Additional aspects will be set forth in part in the description which follows and, in part, will be apparent from the description, or may be learned by practice of the presented embodiments.

In accordance with an aspect of the disclosure, a humidification module is provided. The humidification module includes a supply part supplying water, a droplet generation part generating droplets by using the water supplied through the supply part, and a blowing part discharging the generated droplets to the outside, wherein the droplet generation part includes a nozzle part including a plurality of nozzles spraying the water supplied through the supply part, and an electrode part including a substrate on which a plurality of holes corresponding to the plurality of respective nozzles are formed and electrodes arranged around the plurality of holes for supplying a voltage to the plurality of nozzles, and the plurality of respective nozzles are arranged to penetrate the corresponding holes.

Also, the electrode part may further include a conducting wire connecting the plurality of electrodes arranged around the plurality of holes, and the humidification module may further include a power supply part applying a voltage to the plurality of electrodes through the conducting wire.

In addition, based on the voltage being applied to the plurality of electrodes through the power supply part, a voltage may be induced to the plurality of nozzles penetrating the plurality of holes, and water supplied to the plurality of nozzles may be electrostatically sprayed.

Further, the substrate may be a non-conductive substrate.

Also, inside the nozzle part, a hydrophilic fine structure including hydrophilic particles may be housed.

In addition, based on water being supplied to the nozzle part, an ultrafine capillary may be generated by the hydrophilic fine structure, and the supplied water may be introduced into the plurality of nozzles through the generated ultrafine capillary.

Further, the droplet generation part may include a ground plate which is arranged on the opposite side of the electrode part and which is for generating an electric field.

Also, the droplet generation part and the blowing part may be arranged inside an electric field shielding case.

In addition, the humidification module may include an electrolyte removing part which, based on water being supplied to the inside of the humidification module, collects electrolytes with an electric force through trap electrodes arranged on both sides of a tube wherein the water flows, and removes the electrolytes, and a storage part which stores deionized water from which the electrolytes have been removed.

Further, the supply part may be a valve, and based on the valve opening, the deionized water stored in the storage part may be supplied to the nozzle part.

In accordance with another aspect of the disclosure, an electronic apparatus including a humidification module is provided. The electronic apparatus includes a memory storing at least one instruction, a humidification module generating droplets, and a processor which is connected with the memory and controls the humidification module, wherein the humidification module includes a supply part supplying water, a droplet generation part generating droplets by using the water supplied through the supply part, and a blowing part discharging the generated droplets to the outside, and wherein the droplet generation part includes a nozzle part including a plurality of nozzles spraying the water supplied through the supply part, and an electrode part including a substrate on which a plurality of holes corresponding to the plurality of respective nozzles are formed and electrodes arranged around the plurality of holes for supplying a voltage to the plurality of nozzles, and the plurality of respective nozzles are arranged to penetrate the corresponding holes.

Also, the electronic apparatus may include a wind duct which is located on the opposite side of the blowing part and is formed such that the generated droplets are discharged to the outside.

In addition, the processor may control the power supply part to apply the voltage to the plurality of electrodes, and based on the voltage being applied to the plurality of electrodes through the power supply part, a voltage may be induced to the plurality of nozzles penetrating the plurality of holes, and water supplied to the plurality of nozzles may be electrostatically sprayed.

Further, the processor may, based on a user input for adjusting the humidification amount being received, control the power supply part to apply a voltage corresponding to the user input to the plurality of electrodes, or control the blowing part to generate wind of a strength corresponding to the user input.

Also, the droplet generation part and the blowing part may be arranged inside an electric field shielding case.

In the humidification module as described above, a voltage structure for electrostatic spray was simplified as one electrode plate, and as electrodes were arranged on a non-conductive substrate, safety regarding heat generation, etc. was secured, and by using a non-conductive substrate, an effect of reducing the production cost compared to a metal substrate can be achieved.

Also, as nozzles penetrate holes wherein electrodes are arranged, the distance between the nozzles and the electrodes becomes close, and thus the efficiency that the nozzles are charged can become higher.

In addition, through a hydrophilic fine structure housed inside a nozzle part, an effect that a capillary phenomenon and a hydrophilization effect can be simultaneously secured can be achieved.

Further, the electronic apparatus may include an electrolyte removing part which, based on water being supplied to the inside of the humidification module, collects electrolytes with an electric force through trap electrodes arranged on both sides of a tube wherein the water flows, and removes the electrolytes, and a storage part which stores deionized water from which the electrolytes have been removed.

Also, the supply part may be a valve, and the processor may, based on a user instruction for operating the humidification module being input, control to open the valve, and based on the valve opening, the deionized water stored in the storage part may be supplied to the nozzle part.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, the expressions "first," "second," and the like used in the disclosure may be used to describe various elements regardless of any order and/or degree of importance. Also, such expressions are used only to distinguish one element from another element, and are not intended to limit the elements. For example, a first user apparatus and a second user apparatus may refer to user apparatuses that are different from each other, regardless of any order or degree of importance. Accordingly, a first element may be called a second element, and a second element may be called a first element in a similar manner, without departing from the scope described in the disclosure.

Also, the terms used in the disclosure are used just to explain specific embodiments of the disclosure, and are not intended to limit the scope of the other embodiments. The terms used herein, including technical or scientific terms, may have meanings identical to those generally understood by those of ordinary skill in the art described in the disclosure. Terms defined in general dictionaries among the terms used in the disclosure may be interpreted to have the same meaning as or a similar meaning to the contextual meaning in the related art. Unless defined clearly in the disclosure, the terms used herein may not be interpreted to have an ideal or overly formal meaning. In some cases, even terms defined in the disclosure may not be interpreted to exclude the embodiments of the disclosure.

Figure 1:
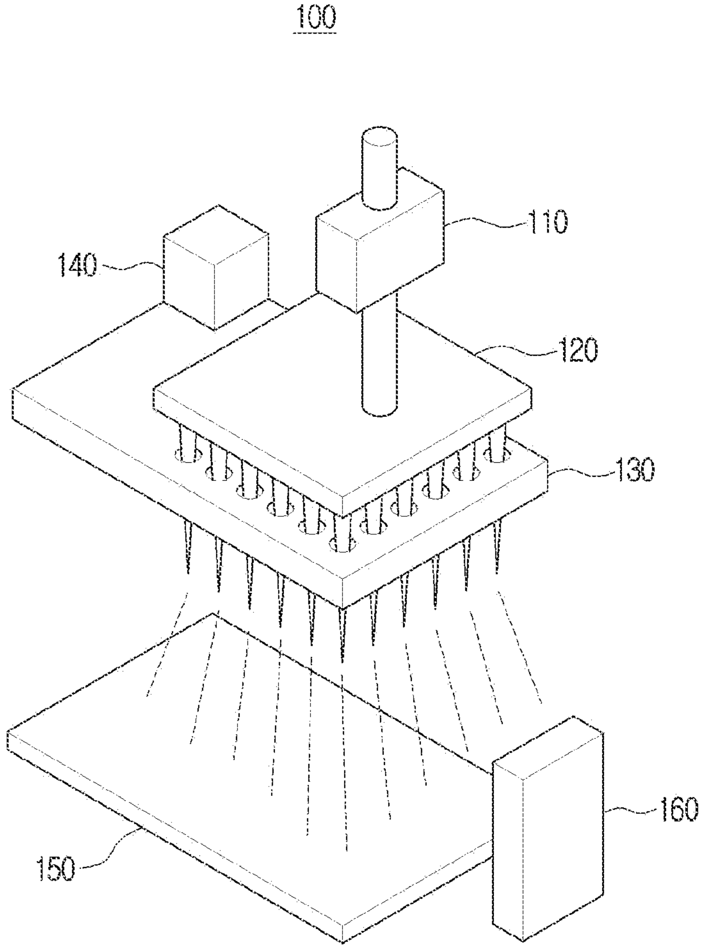
FIG. 1 is a diagram schematically illustrating a humidification module according to an embodiment of the disclosure.

Hereinafter, a humidification module according to an embodiment of the disclosure will be described with reference to the accompanying drawings. FIG. 1 is a diagram schematically illustrating a humidification module according to an embodiment of the disclosure. Referring to FIG. 1, the humidification module 100 may include a supply part 110, a nozzle part 120, an electrode part 130, a power supply part 140, a ground plate 150, and a blowing part 160. However, the humidification module 100 illustrated in FIG. 1 is merely an example, and other components can be added, or some components can be deleted.

The supply part 110 provides water supplied from the outside to a droplet generation part. In particular, the supply part 110 may include a valve and a water pipe. Here, the water pipe may connect between a storage part storing water and the nozzle part 120, and the valve may be opened or closed according to a user input for performing a humidifying operation. Also, the opening degree of the valve may be adjusted according to a user input for adjusting the humidification amount. Meanwhile, water supplied from the outside (or water stored in the storage part) according to an embodiment of the disclosure may be deionized water from which electrolytes have been removed.

The droplet generation part may generate droplets by electrostatically spraying the water supplied from the supply part 110. Here, the drop generation part may include the nozzle part 120 and the electrode part 130.

The nozzle part 120 may include a plurality of nozzles for spraying the water supplied from the supply part 110. In particular, the water supplied to the plurality of nozzles may be electrostatically sprayed by a voltage applied to the electrode part 130.

Figure 2A:
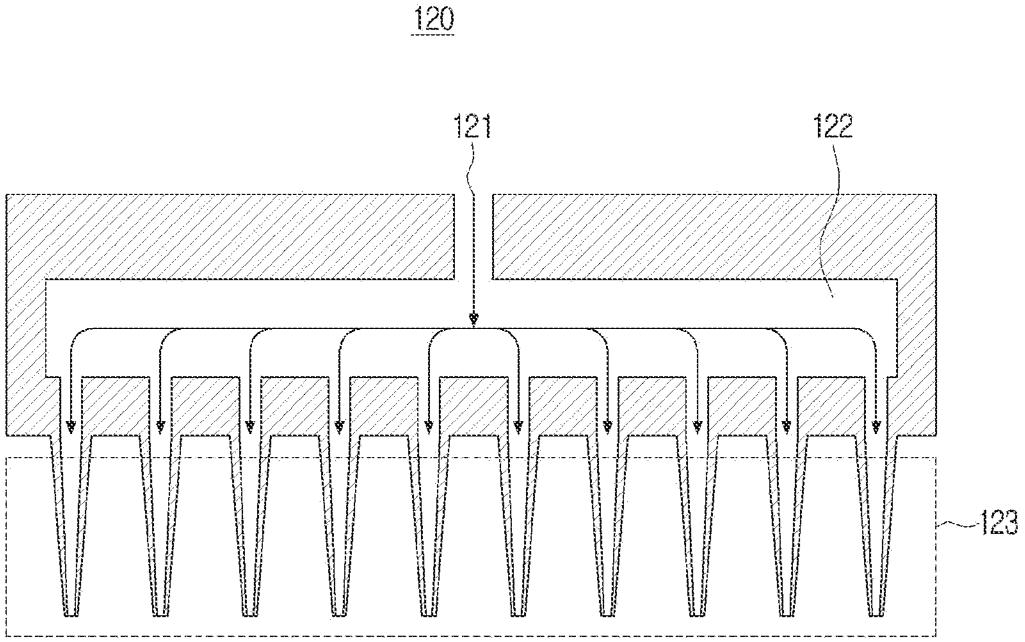
FIG. 2A is a diagram for illustrating a configuration of a nozzle part according to an embodiment of the disclosure.

FIG. 2A is a diagram for illustrating a configuration of a nozzle part according to an embodiment of the disclosure.

Figure 2B:
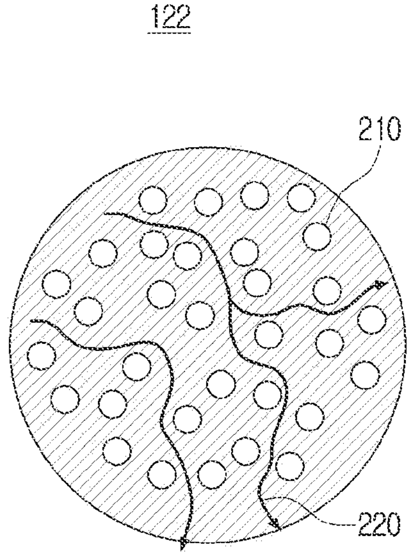
FIG. 2B is a diagram for illustrating a hydrophilic fine structure included in a nozzle part according to an embodiment of the disclosure.

FIG. 2B is a diagram for illustrating a hydrophilic fine structure included in a nozzle part according to an embodiment of the disclosure.

The nozzle part 120 will be described in more detail with reference to FIGS. 2A and 2B. Referring to FIG. 2A, the nozzle part 120 may include a water inlet 121, a hydrophilic fine structure 122, and a plurality of nozzles 123.

The water inlet 121 receives the water supplied from the supply part 110. The water supplied by the water inlet 121 may be supplied to the plurality of nozzles 123 through the hydrophilic fine structure 122.

Meanwhile, when spraying water through a plurality of nozzles having a very small diameter, if water in the same amount is not supplied to the plurality of nozzles, problems may occur which are that, as the amount of droplets sprayed through the plurality of nozzles is reduced, humidification efficiency decreases, and also, as water having high water pressure is supplied to only some of the plurality of nozzles, the stability of the nozzles decreases.

According to an embodiment of the disclosure, for resolving the aforementioned problems, the hydrophilic fine structure 122 may be housed in the inside of the nozzle part 120 (including the insides of the plurality of nozzles 123). Here, the hydrophilic fine structure 122 may include hydrophilic nano particles or hydrophilic micro particles.

Referring to FIG. 2B, the hydrophilic fine structure 122 may include an ultrafine capillary 220 generated through empty spaces among the hydrophilic nano particles or hydrophilic micro particles 210. Here, as an example of a method of generating the ultrafine capillary structure, the ultrafine capillary structure may be generated by a method of supplying water to the hydrophilic fine structure 122 including the hydrophilic nano particles or the hydrophilic micro particles 210, and making the supplied water pass through the nozzles. As the ultrafine capillary is implemented in a size of scores of micrometers, a strong capillary force can be secured.

As the ultrafine capillary structure is generated in the inside of the nozzle part 120 and the insides of the plurality of nozzles 123, and the distribution of the hydrophilic fine structure 122 is homogenous on the whole, the capillary force of the ultrafine capillary 220 may be identical with respect to the inside of the nozzle part 120 and the insides of the plurality of nozzles 123.

When water is introduced into the nozzle part 120 by this, the water may be spread to the inside of the nozzle part 120 by the water pressure, and here, the water may be supplied to the inside of the nozzle part 120 homogenously through the homogenous capillary force. Afterwards, if water in a specific amount or more is supplied, the water may be introduced into the insides of the plurality of nozzles 123 homogenously, and a sufficient spraying amount can be secured. Not only that, as a capillary force by the ultrafine structure, but not the nozzle inner diameter is secured, a stronger capillary force can be exerted, and as a capillary phenomenon and hydrophilization can be secured simultaneously, the manufacturing process can be simplified. In addition, as the capillary is also introduced into the insides of the plurality of nozzles 123, restriction on the diameters of the nozzles themselves is removed, and thus manufacture of nozzles can become easier.

The plurality of nozzles 123 may spray the water supplied from the supply part 110. Here, the supplied water may be electrostatically sprayed by a voltage applied to electrodes corresponding to the plurality of respective nozzles 123. Here, the plurality of nozzles 123 may be in a form of protruding to the direction of the ground plate 150.

In particular, the diameter of each of the plurality of nozzles 123 may be scores to hundreds of micrometers. When nozzles in a diameter of scores to hundreds of micrometers are used, droplets in a size of hundreds of nanometers can be obtained. Also, the plurality of nozzles may be in a form of which thickness becomes thinner as it is more toward the direction of the ground plate. For example, the plurality of nozzles may be in a cone shape or a polygonal horn shape. Due to the characteristic of electrostatic spray, the starting voltage of electrostatic spray decreases as the diameter of nozzles decreases. Thus, in the case of using nozzles in a shape of which thickness becomes thinner as it is more toward the direction of the ground plate, more stable spray can become possible. However, this is merely an example, and the nozzles can be implemented in other shapes such as a cylindrical shape.

Referring to FIG. 1 again, the electrode part 130 may include electrodes for generating electrostatic spray by using water supplied to the plurality of nozzles 123.

Figure 3A:
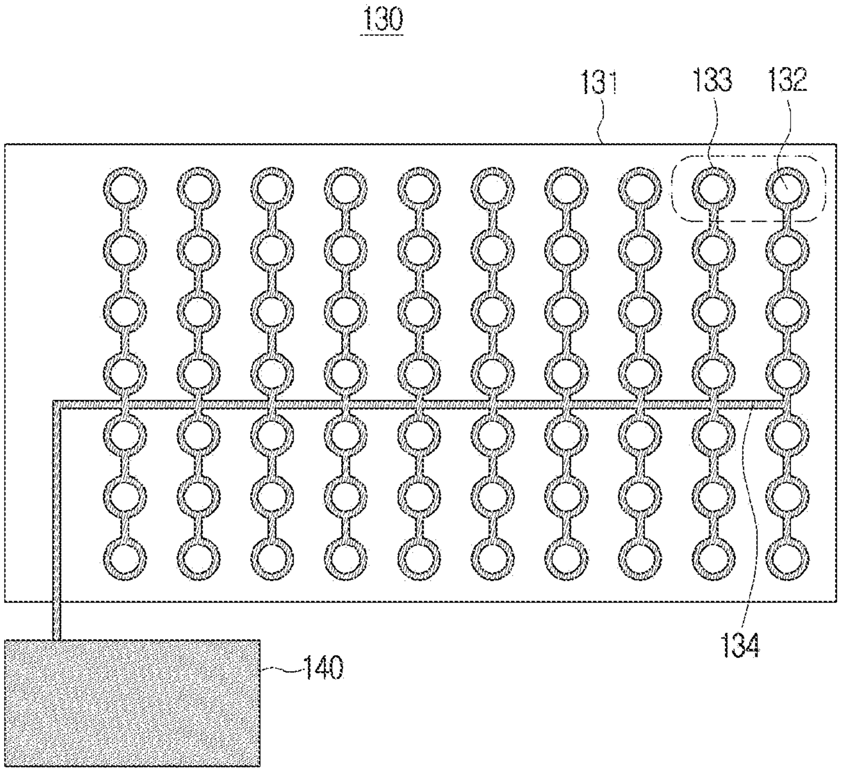
FIG. 3A is a diagram for illustrating a configuration of an electrode part according to an embodiment of the disclosure.

FIG. 3A is a diagram for illustrating a configuration of an electrode part according to an embodiment of the disclosure.

Referring to FIG. 3A, the electrode part 130 may include a substrate 131 on which a plurality of holes 132 corresponding to the plurality of respective nozzles 123 are formed. Also, the electrode part 130 may include electrodes 133 arranged around the plurality of holes 132 for supplying a voltage to the plurality of nozzles 123.

Here, the plurality of holes 132 may have the number corresponding to the plurality of nozzles 123, and may be a circular form, but this is merely an example, and the plurality of holes 132 may be implemented as a polygon or an oval. Also, the plurality of electrodes 133 may be arranged to surround the plurality of holes 132, and may have the number corresponding to the plurality of nozzles 123.

In addition, the plurality of electrodes 133 may have a ring shape, and the plurality of electrodes 133 may receive a voltage through a conducting wire 134 connected to the power supply part 140. Here, the plurality of electrodes 133 may be implemented as a metallic conductive material, and as an example, they may be implemented as copper. When a voltage is applied to the conducting wire 134 through the power supply part 140, the same potential difference is generated in the plurality of electrodes 133, and the same voltage may be applied to the plurality of electrodes 133.

Figure 3B:
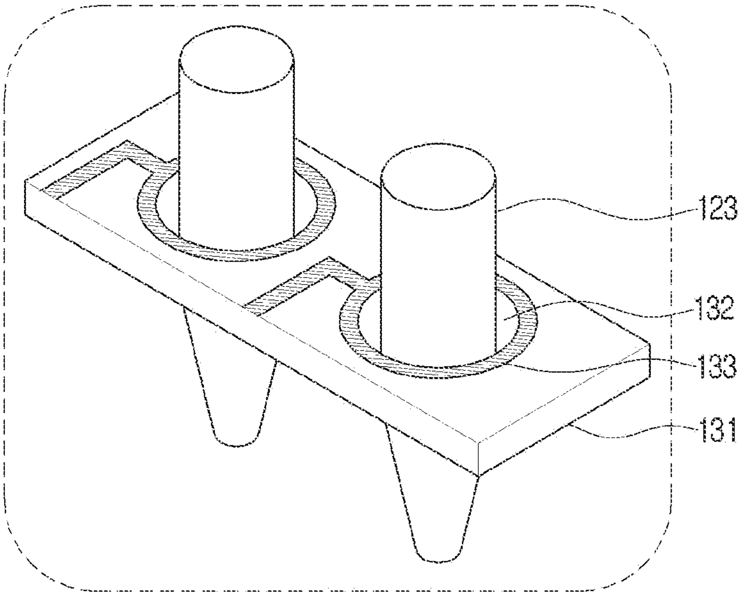
FIG. 3B is a diagram for illustrating an arrangement relation between a nozzle and an electrode part according to an embodiment of the disclosure.

FIG. 3B is a diagram for illustrating an arrangement relation between a nozzle and an electrode part according to an embodiment of the disclosure.

Referring to FIG. 3B, each of the plurality of nozzles 123 may be arranged to penetrate the corresponding holes 132 included in the substrate 131. Here, individual electrodes 133 may be arranged around the holes 132, and electrostatic spray may be generated by a voltage applied to the individual electrodes 133. That is, when a voltage is applied to the electrodes 133 surrounding the holes 132, the voltage is induced to the nozzles 123 penetrating the hole 132, and thus electrostatic spray may be generated.

Also, the substrate 131 according to an embodiment of the disclosure may be implemented as a non-conductive material. The non-conductive material can save the production cost more than a metal substrate, and also, it can be more advantageous than a metal substrate in the aspect of safety such as heat generation and discharge in the air, etc.

In addition, as in an embodiment of the disclosure, the substrate 131 has a structure wherein the nozzles penetrate the holes, and thus the interval between the nozzles and the electrodes becomes close, and accordingly, an effect that the charging efficiency becomes higher can be generated.

Referring to FIG. 1 again, the power supply part 140 may supply a voltage to the plurality of respective electrodes 133 arranged on the substrate 131 through the conducting wire 134. By this, the power supply part 140 may induce the voltage to the water supplied to the insides of the nozzles, and thereby induce micronization of the water. That is, micronization of the water may be induced through an interaction between an electrical force and surface tension of a fluid (water).

On the opposite side of the electrode part 130, the ground plate 150 may be arranged. By the ground plate 150, an electrical field may be formed between the electrode part 130 and the ground plate 150, and by this, a phenomenon that droplets generated by the nozzles return to the electrode part 130 can be prevented, and the electrical field may perform a role of making the droplets generated by the nozzles 123 diffused to all directions, but not a specific direction.

Meanwhile, the feature that the ground plate 150 is arranged on the opposite side of the electrode part 130 is merely an example, and a plate to which a voltage having an opposite polarity to the voltage applied to the electrode part 130 is applied can be included.

The blowing part 160 may generate wind for discharging droplets generated by the droplet generation part to the outside. Here, on the opposite side of the blowing part 160, a wind duct formed to discharge wind to the outside may be arranged. Here, the blowing part 160 may be implemented as a fan for generating wind, but this is merely an example, and the blowing part 160 may be implemented in a different form.

Meanwhile, the droplet generation parts (e.g., nozzle part 120, electrode part 130) and the blowing part 160 may be arranged inside an electrical field shielding case, and may be sealed.

Figure 4:
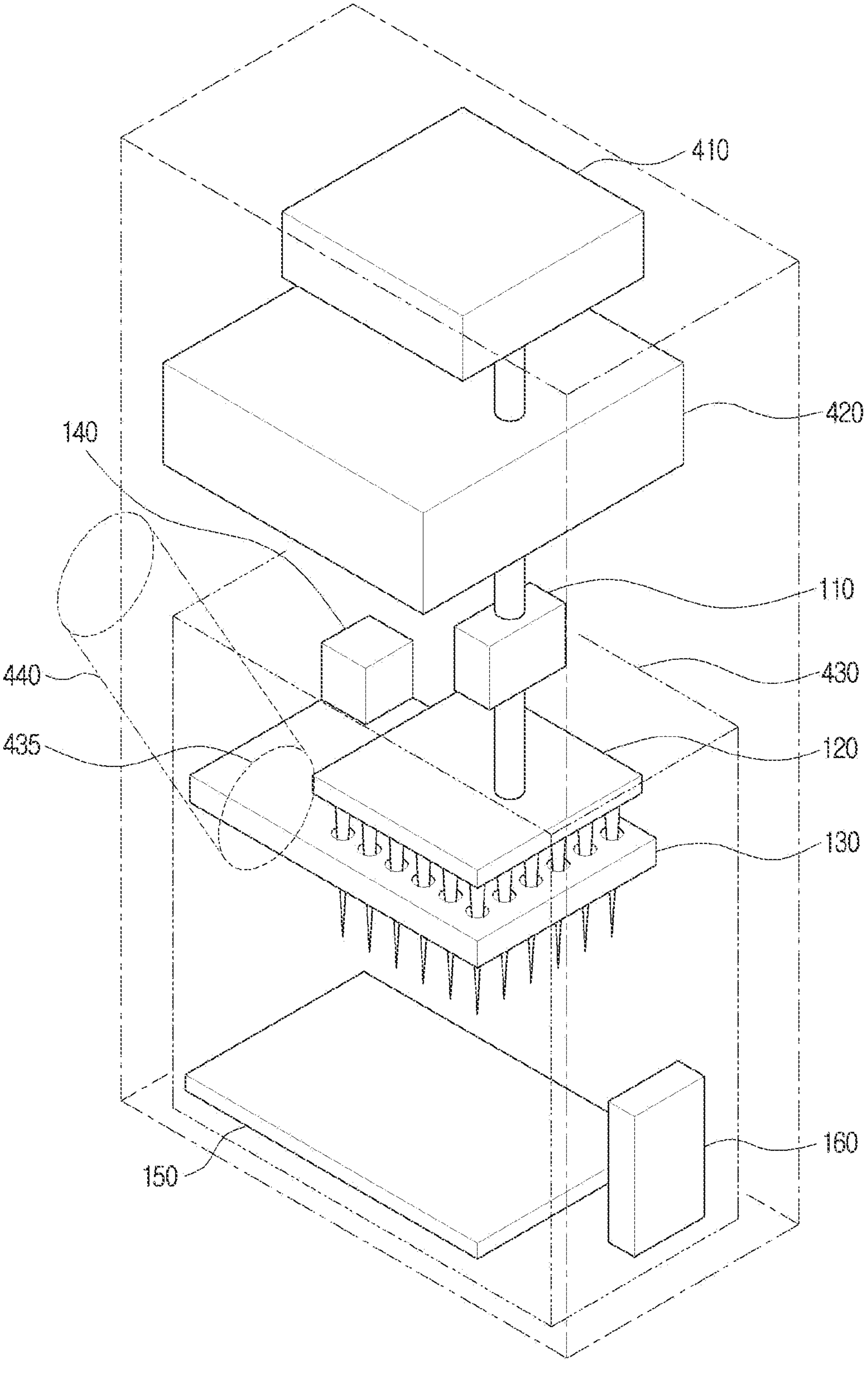
FIG. 4 is a diagram schematically illustrating a humidification module according to an embodiment of the disclosure.

FIG. 4 is a diagram schematically illustrating a humidification module according to an embodiment of the disclosure. Other than components 110, 120, 130, 140, 150, and 160 of the humidification module illustrated in FIG. 1, FIG. 4 may further include an electrolyte removing part 410, a storage part 420, an electrical field shielding case 430, and a wind duct 440. Among the components illustrated in FIG. 4, regarding the components described in FIG. 1, overlapping explanation can be omitted.

The electrolyte removing part 410 may remove electrolytes in water supplied to the humidification module 100 from the outside. Specifically, when water is supplied to the inside of the humidification module 100, the electrolyte removing part 410 may collect the electrolytes with an electrical force through trap electrodes arranged around the pipe through which the water flows, and remove the electrolytes.

Figure 5:
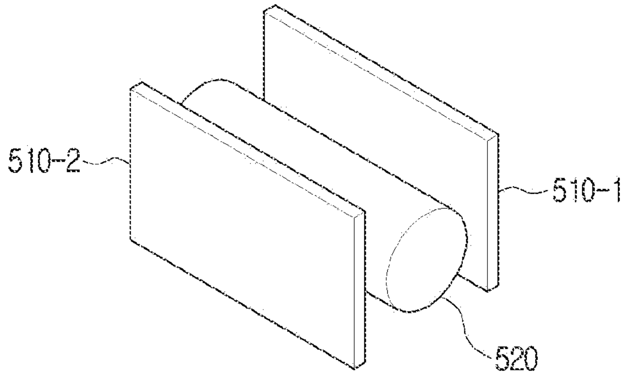
FIG. 5 is a diagram for illustrating a trap electrode according to an embodiment of the disclosure.

FIG. 5 is a diagram for illustrating a trap electrode according to an embodiment of the disclosure.

Referring to FIG. 5, trap electrodes 510-1, 510-2 may be arranged on both sides of a pipe 520 through which water flows, and when a voltage is applied to the trap electrodes 510-1, 510-2, an electrical field may be formed between the trap electrodes 510-1, 510-2, and electrolytes in the water flowing in the pipe 520 may be collected. As described above, electrolytes in water are collected and deionized water is generated, and accordingly, electrostatic spray can be made possible with respect to water rich in electrolytes (e.g., tap water).

The storage part 420 may store deionized water from which electrolytes have been removed by the electrolyte removing part 410. Here, the storage part 420 may also be referred to as a water bucket, and when the supply part 110 (i.e., the valve) is opened, the water stored in the storage part 420 (i.e., deionized water) may be supplied to the nozzle part 120.

Meanwhile, the feature that the electrolyte removing part 410 is arranged before the storage part 420 and the storage part 420 stores deionized water is merely an example, and the electrolyte removing part 410 may be arranged on the rear end of the storage part 420. That is, before the water stored in the storage part 420 is supplied to the nozzle part 120, electrolytes may be removed by the electrolyte removing part 410.

The electrical field shielding case 430 may seal the nozzle part 120, the electrode part 130, the power supply part 140, the ground plate 150, and the blowing part 160, and may prevent an electrical field generated from these components from going to the outside.

In one area of the electrical field shielding case 430, a hole 435 connected to the wind duct 440 may be formed. Here, the hole 435 may be located on the opposite side of the blowing part 160 such that droplets are discharged to the outside by the wind generated by the blowing part 160.

The wind duct 440 may be formed to discharge the droplets moving together with the wind of the blowing part 160 to the outside. That is, on the wind duct 440, a hole may be formed toward the outside such that droplets are discharged to the outside of the humidification module 100.

In the humidification module 100 as described above, a voltage structure for electrostatic spray was simplified as one electrode plate, and as electrodes were arranged on a non-conductive substrate, safety regarding heat generation, etc. was secured, and by using a non-conductive substrate, an effect of reducing the production cost compared to a metal substrate can be achieved.

Also, as the nozzles penetrate the holes wherein the electrodes are arranged, the distance between the nozzles and the electrodes becomes close, and thus the efficiency that the nozzles are charged can become higher.

In addition, through the hydrophilic fine structure housed inside the nozzle part, an effect that a capillary phenomenon and a hydrophilization effect can be simultaneously secured can be achieved.

Figure 6:
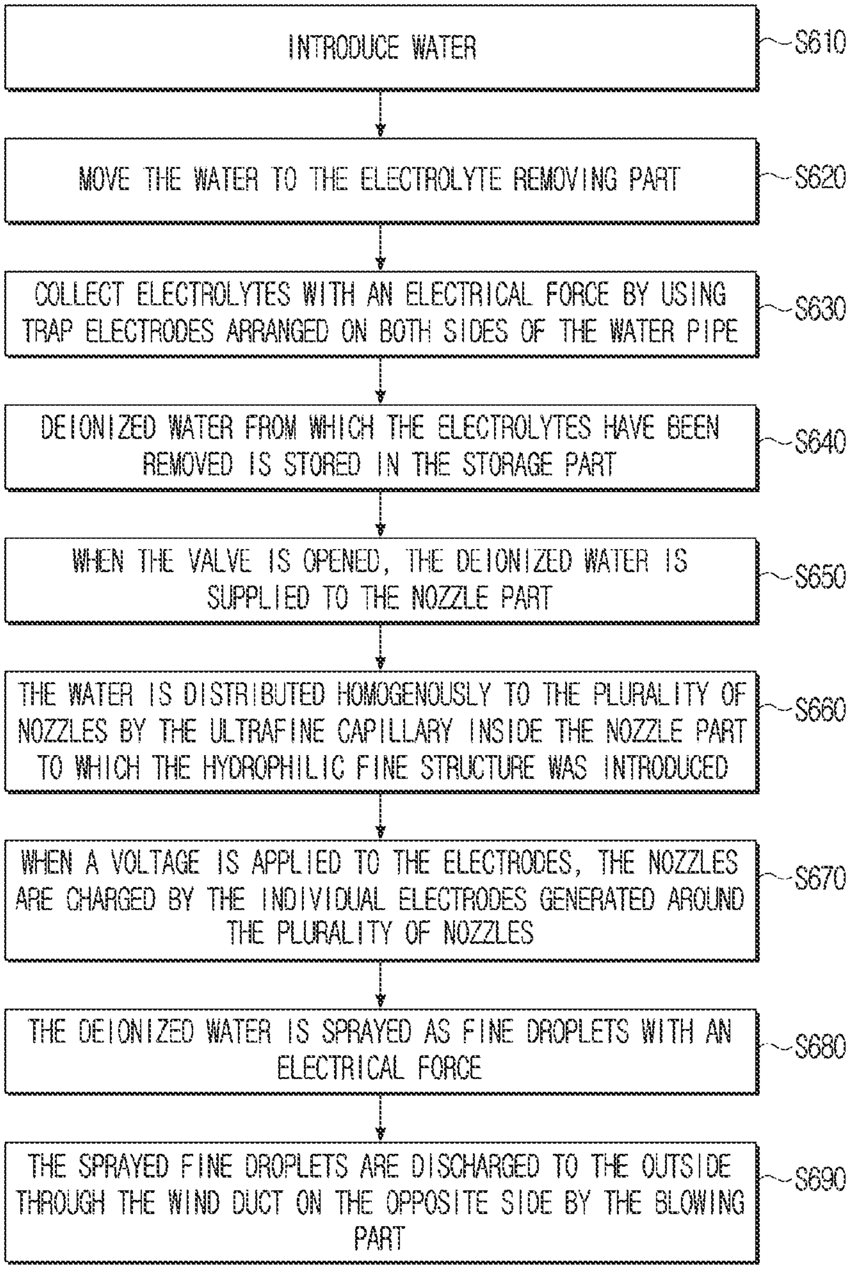
FIG. 6 is a flow chart for illustrating an operation of a humidification module according to an embodiment of the disclosure.

FIG. 6 is a flow chart for illustrating an operation of a humidification module according to an embodiment of the disclosure.

First, water may be introduced into the humidification module 100, in operation S610. Here, the water may be water including electrolytes such as tap water, but this is merely an example, and the water may be water that can be used in households such as filtered water.

The introduced water may be moved to the electrolyte removing part 410, in operation S620.

By using the trap electrodes 510-1, 510-2 arranged on both sides of the water pipe, electrolytes may be collected with an electrical force, in operation S630.

Deionized water from which electrolytes have been removed may be stored in the storage part 420, in operation S640.

When the valve is opened, the deionized water may be supplied to the nozzle part 120, in operation S650.

Here, inside the nozzle part 120 wherein the hydrophilic fine structure 122 is housed, water may be distributed homogenously to the plurality of nozzles 123 by the ultrafine capillary 220, in operation S660.

When a voltage is applied to the electrodes 133, the nozzles 123 may be charged by the individual electrodes 133 arranged around the plurality of nozzles 123, in operation S670.

When the nozzles 123 are charged, the deionized water may be sprayed as fine droplets with the electrical force, in operation S680. That is, when a voltage is applied to the plurality of electrodes 133 through the power supply part 140, the voltage may be induced to the plurality of nozzles 123 penetrating the plurality of holes 132, and the water supplied to the plurality of nozzles may be electrostatically sprayed, and fine droplets may thereby be sprayed.

The sprayed fine droplets may be discharged to the outside through the wind duct on the opposite side by the blowing part 160, in operation S690.

Figure 7:
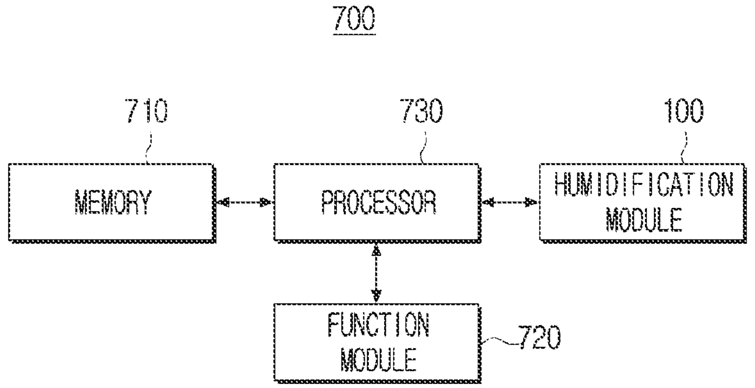
FIG. 7 is a block diagram including components of an electronic apparatus including a humidification module according to an embodiment of the disclosure.

FIG. 7 is a block diagram including components of an electronic apparatus including a humidification module according to an embodiment of the disclosure. Specifically, an electronic apparatus 700 is an apparatus including the humidification module 100, and it may be a humidifier. However, this is merely an example, and the electronic apparatus 700 may be implemented as not only home appliances such as an air purifier, a clothes care apparatus, etc., but also apparatuses such as a car air conditioner.

Specifically, in a memory 710, at least one instruction for controlling the electronic apparatus 700 may be stored. In particular, the memory 710 may store an instruction controlling a function module 720 for performing the functions of the electronic apparatus 700, an instruction for controlling the humidification module 100, etc.

Also, in the memory 710, an operating system (O/S) for driving the electronic apparatus 700 may be stored. Also, in the memory 710, various kinds of software modules for the electronic apparatus 700 to operate according to the various embodiments of the disclosure may be stored, and a processor 730 may control the operations of the electronic apparatus 700 by executing the various kinds of software modules stored in the memory 710. That is, the memory 710 may be accessed by the processor 730, and reading/recording/correcting/deleting/updating, etc. of data by the processor 730 may be performed. Meanwhile, in the disclosure, the term memory 710 may be used as the meaning including the memory 710, a read-only memory (ROM) (not shown) or a random-access memory (RAM) (not shown) inside the processor 730, or a memory card (not shown) (e.g., a micro secure digital (SD) card, a memory stick) installed on the electronic apparatus 700.

The function module 720 is a component performing the functions of the electronic apparatus 700 according to the type of the electronic apparatus 700. For example, in case the electronic apparatus 700 is an air purifier, the function module 720 may include a dust collecting apparatus for air purification, etc. Also, in case the electronic apparatus 700 is a clothes care apparatus, the function module 720 may include a sterilization apparatus for clothes care, etc. Further, in case the electronic apparatus 700 is a car air conditioner, the function module 720 may include an air conditioning apparatus for a cooling function, etc.

Referring to FIGS. 1, 2A, 2B, 3A, 3B, 4, 5, 6, and 7, the humidification module 100 may electrostatically spray water supplied to the plurality of nozzles 123 and generate droplets, and discharge the generated droplets to the outside. In particular, the humidification module 100 may control whether to perform a humidifying operation, the humidification amount, etc. according to control by the processor 730.

The processor 730 may control the overall operations and functions of the humidification module 100 or the electronic apparatus 700. Specifically, the processor 730 may be connected to the components of the humidification module 100 or the electronic apparatus 700 including the memory 710, and by executing at least one instruction or module stored in the memory 710 as described above, the processor 730 may control the overall operations of the humidification module 100 or the electronic apparatus 700.

The processor 730 may be implemented in various ways. For example, the processor 730 may be implemented as at least one of an application specific integrated circuit (ASIC), an embedded processor, a microprocessor, hardware control logic, a hardware finite state machine (FSM), or a digital signal processor (DSP). Meanwhile, in the disclosure, the term processor 730 may be used as the meaning including a central processing unit (CPU), a graphic processing unit (GPU), a main processing unit (MPU), etc.

In particular, the processor 730 may control the humidifying operation of the humidification module 100 included in the electronic apparatus 700. Specifically, if a user input for performing the humidifying operation is detected, the processor 730 may control the supply part 110 to open the valve, and control the power supply part 140 to apply a voltage to the plurality of electrodes 133 arranged on the substrate 131.

When a voltage is applied to the plurality of electrodes 133 through the power supply part 140, the voltage may be induced to the plurality of nozzles 123 penetrating the plurality of holes 132, and the water supplied to the plurality of nozzles 123 may be electrostatically sprayed, and fine droplets may thereby be generated.

As an example, if a user input for adjusting the humidification amount is received, the processor 730 may control the power supply part 140 to apply a voltage corresponding to the user input to the plurality of electrodes 133. Specifically, if a user input for increasing the humidification amount is received, the processor 730 may control the power supply part 140 to increase the voltage applied to the plurality of electrodes 133. Also, if a user input for decreasing the humidification amount is received, the processor 730 may control the power supply part 140 to decrease the voltage applied to the plurality of electrodes 133.

As another example, if a user input for adjusting the humidification amount is received, the processor 730 may control the blowing part 160 to generate wind of a strength corresponding to the user input. Specifically, if a user input for increasing the humidification amount is received, the processor 730 may control the blowing part 160 to increase the strength of wind, and if a user input for decreasing the humidification amount is received, the processor 730 may control the blowing part 160 to decrease the strength of wind.

Meanwhile, in the embodiment described above, it was described that a voltage applied to the plurality of electrodes 133 or the strength of wind of the blowing part 160 is adjusted for adjusting the humidification amount, but this is merely an example, and the disclosure may be implemented by other methods for adjusting the humidification amount. For example, a voltage induced to the nozzles 123 may be adjusted by moving the substrate 131 in upper or lower directions, or the valve may be adjusted, and the amount of water supplied to the nozzle part 120 may thereby be adjusted.

In particular, in case the electronic apparatus 700 is implemented as an air purifier, fine droplets in a level of a few micrometers are sprayed by the humidification module 100 according to an embodiment of the disclosure, and thus effects such as collecting of fine dust and collecting of microorganisms, etc. can be expected. Also, by introducing electrostatic spray in the midst of the flow of air, fine dust or microorganisms existing in the air can be filtered out. Further, in case the electronic apparatus 700 is implemented as a clothes care apparatus, dust or odor, etc. can be removed by using fine droplets generated by the humidification module 100 according to an embodiment of the disclosure.

In addition, in case the electronic apparatus 700 is implemented as a car air conditioner, dust or odor generated from the air conditioner can be removed by using fine droplets generated by the humidification module 100 according to an embodiment of the disclosure, and thus the expected life span of the air conditioner filter can be increased. Also, by including droplets in the wind of the air conditioner, an additional cooling effect can be expected when the wind contacts the skin of the driver or the fellow rider.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A humidification apparatus comprising:
a supply part configured to supply water;
a droplet generation part configured to generate droplets by using the water supplied through the supply part; and
a blowing part configured to discharge the droplets to an outside,
wherein the droplet generation part comprises:
a nozzle part including a plurality of nozzles spraying the water supplied through the supply part, and
an electrode part comprising:
a substrate on which a plurality of holes corresponding to the plurality of nozzles, respectively, are formed; and
a plurality of electrodes arranged around the plurality of holes, respectively, for supplying a voltage to the plurality of nozzles,
wherein the plurality of nozzles are arranged to penetrate the plurality of holes, respectively, and
wherein a hydrophilic fine structure including hydrophilic particles is housed inside the nozzle part.

2. The humidification apparatus of claim 1,
wherein the electrode part further comprises a conducting wire connecting the plurality of electrodes arranged around the plurality of holes, and
wherein the humidification apparatus further comprises a power supply part applying a voltage to the plurality of electrodes through the conducting wire.

3. The humidification apparatus of claim 2, wherein, based on the voltage being applied to the plurality of electrodes through the conducting wire, a voltage is induced to the plurality of nozzles penetrating the plurality of holes, and water supplied to the plurality of nozzles is electrostatically sprayed.

4. The humidification apparatus of claim 1, wherein the substrate comprises a non-conductive substrate.

5. The humidification apparatus of claim 1, wherein, based on water being supplied to the nozzle part, an ultrafine capillary is generated by the hydrophilic fine structure and the water is introduced into the plurality of nozzles through the generated ultrafine capillary.

6. The humidification apparatus of claim 1, wherein the droplet generation part comprises a ground plate arranged on an opposite side of the electrode part than the droplet generation part, the ground plate being arranged for generating an electric field.

7. The humidification apparatus of claim 1, wherein the droplet generation part and the blowing part are arranged inside an electric field shielding case.

8. The humidification apparatus of claim 1, further comprising:

an electrolyte removing part configured to, based on water being supplied to an inside of the humidification apparatus, collect electrolytes with an electric force through trap electrodes arranged on both sides of a tube in which the water flows and remove the electrolytes; and a storage part storing deionized water from which the electrolytes have been removed.

9. The humidification apparatus of claim 8, wherein the supply part comprises a valve, and wherein, based on the valve opening, the deionized water stored in the storage part is supplied to the nozzle part.

10. An electronic apparatus comprising:

a memory storing at least one instruction;

a humidification apparatus; and a processor connected to the memory and configured to control the humidification apparatus, wherein the humidification apparatus comprises:

a supply part configured to supply water, a droplet generation part configured to generate droplets by using the water supplied through the supply part, and a blowing part configured to discharge the droplets to an outside, wherein the droplet generation part comprises:

a nozzle part including a plurality of nozzles spraying the water supplied through the supply part, and an electrode part comprising:

a substrate on which a plurality of holes corresponding to the plurality of nozzles, respectively, are formed; and a plurality of electrodes arranged around the plurality of holes for supplying a voltage to the plurality of nozzles, wherein the plurality of nozzles are arranged to penetrate the plurality of holes, respectively, wherein a hydrophilic fine structure including hydrophilic particles is housed inside the nozzle part, and wherein the hydrophilic fine structure further includes an ultrafine capillary structure generated through empty spaces among the hydrophilic particles.

11. The electronic apparatus of claim 10, further comprising:

a wind duct located on an opposite side of the electrode part than the blowing part, the wind duct being configured to discharge the droplets to the outside.

12. The electronic apparatus of claim 11, wherein the humidification apparatus further comprises a power supply part, wherein the processor is further configured to:

control the power supply part to apply the voltage to the plurality of electrodes, and wherein, based on the voltage being applied to the plurality of electrodes through the power supply part, a voltage is induced to the plurality of nozzles penetrating the plurality of holes and water supplied to the plurality of nozzles is electrostatically sprayed.

13. The electronic apparatus of claim 12, wherein the processor is further configured to:

based on a user input for adjusting a humidification amount being received, control the power supply part to apply a specific voltage corresponding to the user input to the plurality of electrodes, or control the blowing part to generate wind of a strength corresponding to the user input.

14. The electronic apparatus of claim 10, wherein the droplet generation part and the blowing part are arranged inside an electric field shielding case.

15. The electronic apparatus of claim 10, wherein each of the plurality of electrodes has a ring shape, and wherein the plurality of electrodes are configured to receive a voltage through a conducting wire connected to a power supply part of the humidification apparatus.

16. The electronic apparatus of claim 10, wherein the humidification apparatus further comprises an electrolyte removing part, and wherein the electrolyte removing part is configured to, based on water being supplied to an inside of the humidification apparatus, collect electrolytes with an electrical force through trap electrodes arranged around a pipe in which the water flows and remove the electrolytes to the outside.

* * * * *